United States Patent
Zhou et al.

(10) Patent No.: US 11,851,287 B2
(45) Date of Patent: Dec. 26, 2023

(54) CARRIER AND INSPECTION SYSTEM

(71) Applicants: Tyco Electronics (Shanghai) Co., Ltd., Shanghai (CN); TE Connectivity Services GmbH, Schaffhausen (CH); Kunshan League Automechanism Co., Ltd, Kunshan (CN)

(72) Inventors: Lei (Alex) Zhou, Shanghai (CN); Dandan (Emily) Zhang, Shanghai (CN); Roberto Francisco-Yi Lu, Bellevue, WA (US); Lvhai (Samuel) Hu, Shanghai (CN); Qing (Carrie) Zhou, Shanghai (CN); Yuting He, Kunshan (CN); Jianglin Duan, Kunshan (CN)

(73) Assignees: Tyco Electronics (Shanghai) Co., Ltd., Shanghai (CN); Kunshan League Automechanism Co., Ltd., Kunshan (CN); TE Connectivity Solutions GmbH, Schaffhausen (CH)

( * ) Notice: Subject to any disclaimer, the term of this patent is extended or adjusted under 35 U.S.C. 154(b) by 0 days.

(21) Appl. No.: 17/824,240

(22) Filed: May 25, 2022

(65) Prior Publication Data

US 2022/0380137 A1 Dec. 1, 2022

(30) Foreign Application Priority Data

May 26, 2021 (CN) .......................... 202110581728.8

(51) Int. Cl.
*B65G 47/22* (2006.01)
*B65G 35/06* (2006.01)

(52) U.S. Cl.
CPC ............. *B65G 47/22* (2013.01); *B65G 35/06* (2013.01); *B65G 2203/0208* (2013.01); *B65G 2207/42* (2013.01)

(58) Field of Classification Search
CPC .... B65G 47/22; B65G 35/06; B65G 21/2072; B65G 21/209; B65G 21/20
USPC ................. 198/836.1, 836.2, 836.4, 842, 618
See application file for complete search history.

(56) References Cited

U.S. PATENT DOCUMENTS

| | | | | |
|---|---|---|---|---|
| 4,883,166 A | * | 11/1989 | Whitaker | B65G 15/28 198/688.1 |
| 5,277,246 A | * | 1/1994 | Monch | B65G 15/62 62/266 |
| 5,517,798 A | * | 5/1996 | Klopfenstein | B65B 59/003 198/836.3 |
| 5,682,977 A | * | 11/1997 | White | B65G 21/2063 198/860.3 |
| 6,843,367 B1 | * | 1/2005 | Gentile | B65G 21/2063 406/88 |

(Continued)

*Primary Examiner* — James R Bidwell
(74) *Attorney, Agent, or Firm* — Barley Snyder (57) ABSTRACT

A carrier is configured to hold a product carried on a material strip during horizontal conveying of the material strip. The carrier comprises a first holding member positioned on the upper or lower side of the product on the material strip during the horizontal conveying of the material strip and extending along a conveying direction of the material strip. A first contact surface is formed on the side of the first holding member facing the product, the first contact surface is configured to contact the product during the horizontal conveying of the material strip to limit the up and down bouncing movement of the product.

10 Claims, 5 Drawing Sheets

(56) References Cited

U.S. PATENT DOCUMENTS 7,938,252 B2 * 5/2011 Schroader ............ B65G 21/209
198/836.2

* cited by examiner

CARRIER AND INSPECTION SYSTEM

CROSS-REFERENCE TO RELATED APPLICATION

This application claims the benefit of Chinese Patent Application No. CN202110581728.8 filed on May 26, 2021 in the State Intellectual Property Office of China, the whole disclosure of which is incorporated herein by reference.

FIELD OF THE INVENTION

Embodiments of the present disclosure relate generally to product inspection and, more specifically, to a carrier and an inspection system adapted to high-speed product inspection.

BACKGROUND

After the manufacturing of a product material strip such as a stamping part is completed, usually before cutting products from the product material strip, the products on the product material strip need to be inspected while conveying the product material strip, so as to determine whether the manufactured products are qualified or defective.

During the inspection of the products carried on the product material strip, the product material strip is usually moved at a high speed, such as 400~1000 mm/s, which depends on the pitch or spacing between the products on the product material strip. Since the products are connected to the product material strip, the products carried on the high-speed moving material strip will bounce up and down during transportation, which may damage the products or product material strip and make it difficult to maintain the products level for inspection.

SUMMARY

According to an aspect of the present invention, there is provided a carrier for holding a product carried on a material strip during horizontal conveying of the material strip; the carrier comprises a first holding member positioned on the upper or lower side of the product on the material strip during the horizontal conveying of the material strip and extending along a conveying direction of the material strip; a first contact surface is formed on the side of the first holding member facing the product, the first contact surface is configured to contact the product during the horizontal conveying of the material strip to limit the up and down bouncing movement of the product.

According to an exemplary embodiment of the present invention, a second contact surface is also formed on the side of the first holding member facing the product, and the second contact surface is configured to contact the material strip during the horizontal conveying of the material strip to limit the up and down bouncing movement of the material strip.

According to another exemplary embodiment of the present invention, the first contact surface and the second contact surface extend along the conveying direction of the material strip and are separated from each other.

According to another exemplary embodiment of the present invention, a connecting line along the surface contour of the contact surface between at least any two points of the first contact surface or the second contact surface along the conveying direction of the material strip is a Bezier curve.

According to another exemplary embodiment of the present invention, the product extends from the material strip in a horizontal direction perpendicular to the conveying direction of the material strip, and the first contact surface is configured to contact a free end of the product during the horizontal conveying of the material strip.

According to another exemplary embodiment of the present invention, the carrier further comprises a beam member detachably provided on the side of the first holding member facing the product, and the first contact surface and/or the second contact surface are at least part of the surface of the beam member facing the product or the material strip.

According to another exemplary embodiment of the present invention, the side of the first holding member facing the product is provided with a slot, and the beam member is removably embedded in the slot.

According to another exemplary embodiment of the present invention, the carrier further comprises a second holding member, which is engaged with the first holding member to form an L-shaped structure, at least one of the first holding member and the second holding member is provided with an inspection window to allow to inspect the product on the material strip through the inspection window.

According to another aspect of the present invention, there is provided an inspection system, comprising: the above carrier; and an inspection device configured to inspect the product carried on the carrier.

According to an exemplary embodiment of the present invention, the inspection system further comprises at least one stabilizer, each of which is arranged at upstream or downstream of the carrier along the conveying direction of the material strip, and supports the product and/or the material strip on the side opposite to the first holding member of the carrier.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EMBODIMENT(S)

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a carrier for holding a product carried on a material strip during horizontal conveying of the material strip; the carrier comprises a first holding member positioned on the upper or lower side of the product on the material strip during the horizontal conveying of the material strip and extending along a conveying direction of the material strip; a first contact surface is formed on the side of the first holding member facing the product, the first contact surface is configured to contact the product during the horizontal conveying of the material strip to limit the up and down bouncing movement of the product.

According to an exemplary embodiment of the present disclosure, there is provided an inspection system for performing a variety of inspections, such as visual inspection, including product image acquisition, product defect inspection, product size inspection, etc. on a material strip product, such as a material strip terminal. As an example, a material strip product may include a conductive terminal for an electrical connector, such as a contact formed by stamping a material strip.

Figure 1:
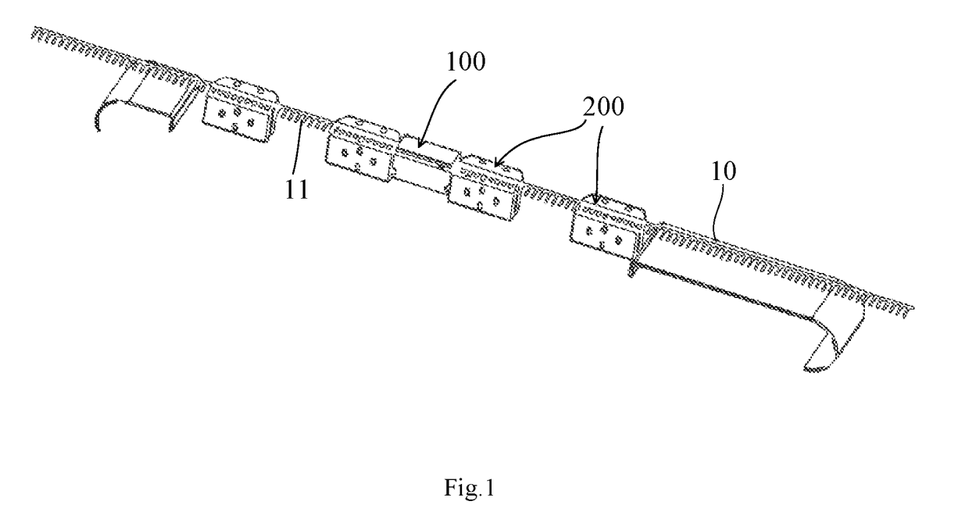
FIG. 1 is a perspective view schematically showing a configuration of an inspection system according to an exemplary embodiment of the present disclosure.
Figure 2:
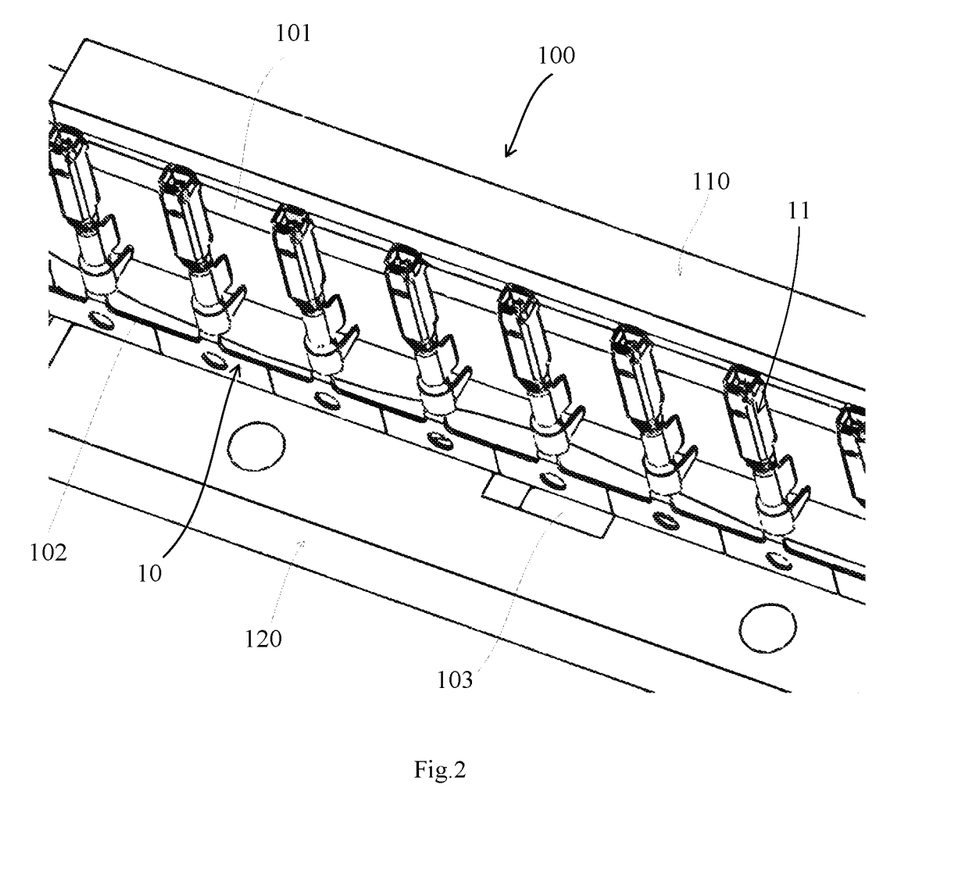
FIG. 2 is a perspective view schematically showing a product carrier according to an exemplary embodiment of the present disclosure, in which a contact surface in contact with a material strip/product is shown.

For material strip products, as shown in FIGS. 1 and 2, a plurality of products 11 are carried or fixed on the punched material strip 10. Generally, before cutting the product 11 from the material strip 10, the material strip 10 is transported through the inspection device to inspect the products on it. The stamped product 11 usually extends in the form of a cantilever with one end fixed on the material strip 10. During the high-speed conveying of the material strip 10, the material strip 10 or the product 11 carried on it will bounce up and down, which may damage the product or material strip, and/or lead to the failure of stable or reliable product inspection.

According to an exemplary embodiment of the present disclosure, as shown in FIGS. 1-5, a fixing device or carrier 100 is provided in the inspection system, which is used to limit the up and down bouncing movement of the product 11 and/or the material strip 10 during the horizontal conveying of the material strip 10 and stably maintain the material strip 10 and the product 11, so that the product 11 and/or the material strip 10 remain roughly horizontal during the horizontal conveying, so as to facilitate the inspection of the product.

Figure 3:
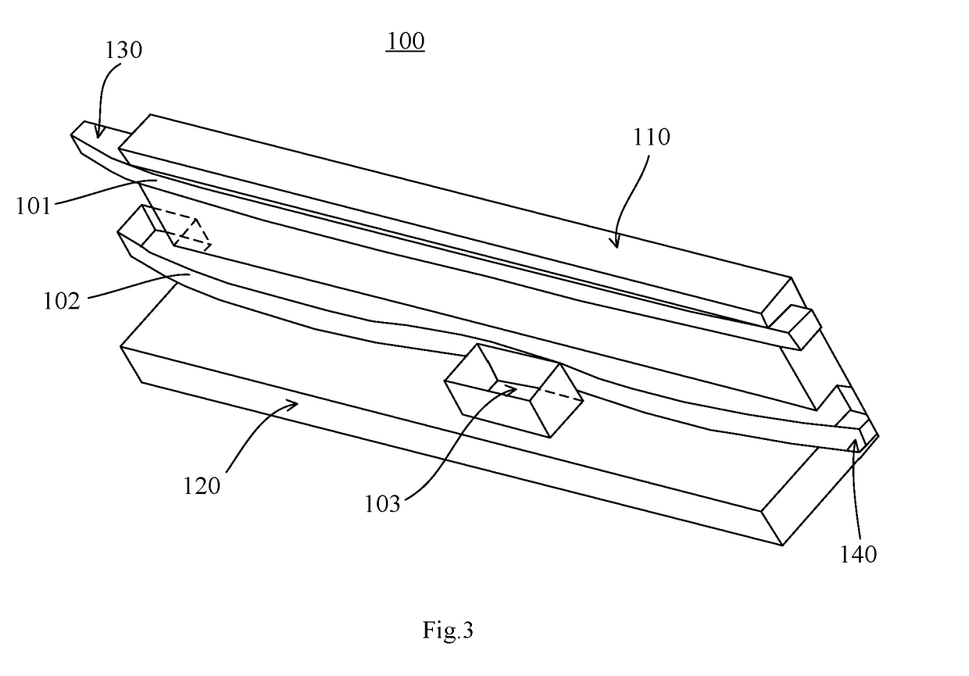
FIG. 3 schematically shows a perspective view of a product carrier according to an exemplary embodiment of the present disclosure.
Figure 4:
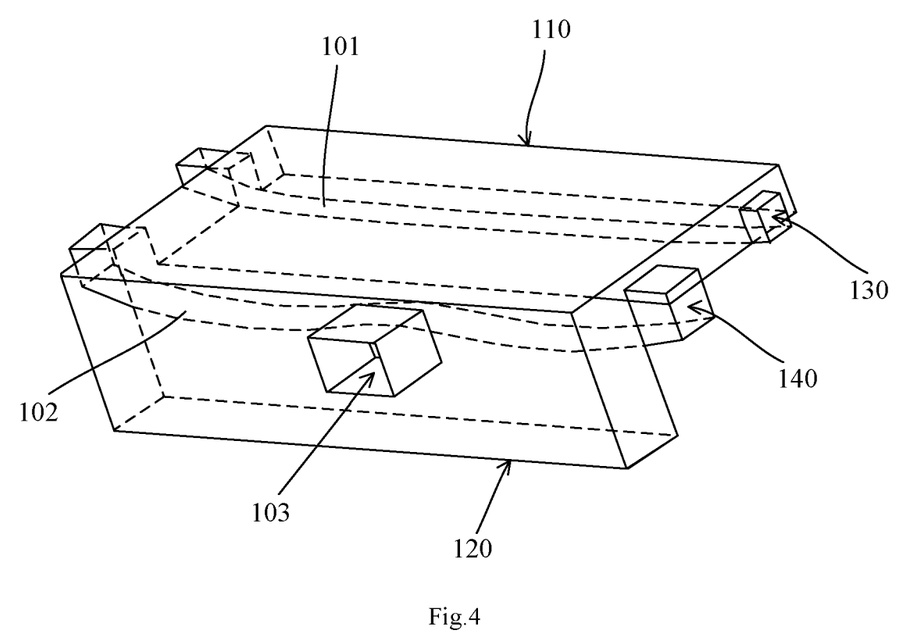
FIG. 4 is a side perspective view schematically showing a product carrier according to an exemplary embodiment of the present disclosure.

In an exemplary embodiment, as shown in FIGS. 2-4, the carrier 100 includes a first holding member 110 that can be positioned on one side of the product 11 on the material strip 10 during the conveying of the material strip 10. When moving or conveying the material strip 10 in the horizontal direction, the product 11 carried on it extends in the horizontal direction as a whole in the form of cantilever. At this time, the first holding member 110 can be positioned on the upper or lower side of the product 11 to limit (e.g. reduce or prevent) the up and down bouncing movement of the product. Thus, it is possible to inspect products carried on the material strip which is moved at high speed (e.g. 400~1000 mm/s).

The first holding member 110 extends along the conveying direction of the material strip 10 and may be formed into a roughly plate-shaped member, for example. According to an exemplary embodiment of the present disclosure, as shown in FIGS. 2-4, a first contact surface 101 is arranged on the side of the first holding member 110 facing the product 11, and the first contact surface 101 is configured to contact, support or fit the product 10 during the horizontal conveying of the material strip 10, so as to limit (E.G., reduce or prevent) the up and down bouncing movement of the product 11.

In the illustrated embodiment, as shown in FIGS. 2-4, a second contact surface 102 can also be arranged on the side of the first holding member 110 facing the product 11 or the material strip 10. The second contact surface 102 is configured to contact, support or fit at least a part of the material strip 10 during the horizontal conveying of the material strip 10 to further reduce or prevent the up and down bouncing movement of the material strip 10.

The first contact surface 101 and the second contact surface 102 may extend along the conveying direction of the material strip 10 and be horizontally separated from each other. In some embodiments, the first contact surface and the second contact surface extend continuously along the conveying direction of the material strip; In other embodiments, the first contact surface and/or the second contact surface may extend intermittently along the conveying direction of the material strip, such as including a plurality of spaced sub contact surfaces extending along the conveying direction of the material strip; For example, an inspection device, such as a sensor or a camera, may be provided in the gap between adjacent sub contact surfaces.

According to an exemplary embodiment of the present disclosure, as shown in FIGS. 2-5, the first contact surface 101 and/or the second contact surface 102 are configured to have a surface profile adapted to the shape of the product or strip, for example, a smooth surface or a smooth curved surface, so as to avoid damaging the product or material strip. As an example, the line along the surface contour of the first contact surface between at least any two points of the first contact surface 101 along the conveying direction of the material strip 10 is a Bezier curve, and/or the line along the surface contour of the second contact surface between at least any two points of the second contact surface 102 along the conveying direction of the material strip 10 is a Bezier curve, which will better adapt or coincide with the shape of the product or material strip. A smooth contact surface is formed to better adapt or fit the bouncing movement of the product or material strip during transportation, so as to avoid damaging the product or material strip, and can also stably maintain the product, such as keeping the product basically horizontal or in the desired orientation for inspection.

For example, the product 11 extends from the material strip 10 in the form of a cantilever in a horizontal direction perpendicular to the conveying direction of the material strip 10, and has a free end away from the material strip 10. The first contact surface 110 may be constructed and arranged to contact or support the free end or a location near the free end of the product 11 during the horizontal conveying of the material strip 10.

In the illustrated embodiment, as shown in FIGS. 2-4, the carrier 100 also includes beam members 130, 140 arranged on the side of the first holding member 110 facing the product 11, such as the first beam member 130 and the second beam member 140, which generally extend along the conveying direction of the material strip. The side of the beam member facing the product or material strip is provided with the above contact surface. For example, the first contact surface 101 is at least part of the surface of the first beam member 130 facing the product or material strip, and/or the second contact surface 102 is at least part of the surface of the second beam member 140 facing the product 11 or material strip 10.

The beam member 130, 140 can be detachably provided on the first holding member 110. For example, a slot extending along the conveying direction of the material strip is formed on the surface of the first holding member 110 facing the product 11, and the beam member can be removably embedded in the corresponding slot. Therefore, according to the inspection requirements of material strip products with different shapes, beam members with contact surfaces corresponding to or consistent with the product shape can be replaced to better limit the bouncing movement of products during transportation.

In the illustrated embodiment, as shown in FIGS. 1-5, the carrier 100 also includes a second holding member 120, which is joined with the first holding member 110. The first and second holding members 110, 120 are integrally formed to a roughly L-shaped structure, so as to at least partially surround the material strip 10 and the product 11.

In the embodiment shown in FIGS. 2-5, an inspection hole or inspection window 103 penetrating the second holding member 120 is provided in the second holding member 120 to allow an inspection device (not shown) such as a camera or a sensor to inspect the product 11 on the material strip 10 through the inspection window 103. In other embodiments, the first holding member may also be provided with an inspection hole or an inspection window penetrating the holding member. It will be understood that the above first or second contact surface contacts or maintains the product 11 on the conveyed material strip 10 at least near or before and after the inspection window, so that the product 11 basically maintains a horizontal or expected orientation without bouncing when moving to the position corresponding to the inspection window, so as to facilitate inspection.

Figure 5:
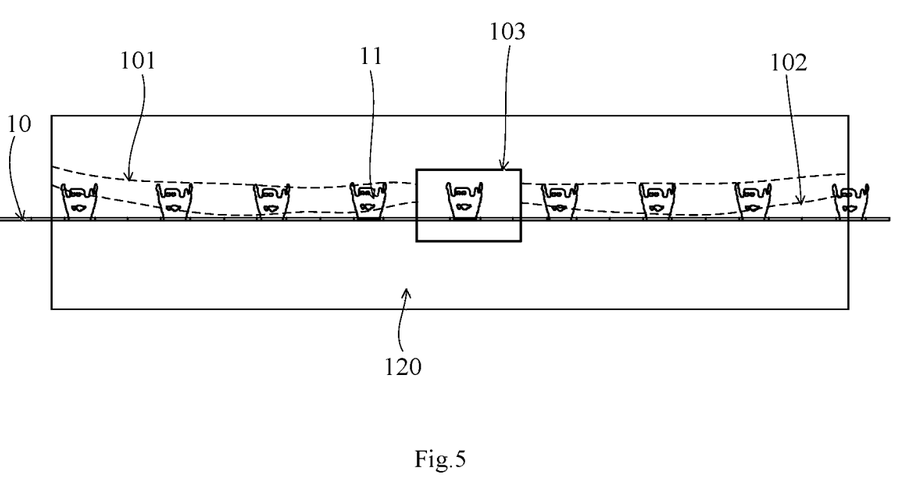
FIG. 5 schematically shows a side view of a product carrier according to an exemplary embodiment of the present disclosure.

In some examples, as shown in FIG. 5, at the position corresponding to such an inspection window (such as horizontal alignment), the above first or second contact surface does not exist, or the first or second contact surface is disconnected at this position, so as to allow the inspection device to inspect the product moved to this position through the inspection window.

Accordingly, embodiments of the present disclosure also provide an inspection system comprising a carrier and an inspection device described in any embodiment of the present disclosure, which is configured to inspect a product carried on the carrier.

As shown in FIG. 1, the inspection system may also include at least one stabilizer 200, including, for example, a plate-shaped member. Each of the at least one stabilizer 200 is arranged at upstream or downstream of the carrier 100 along the conveying direction of the material strip, and supports the product 11 and/or the material strip 10 on the side opposite to the first holding member 110 of the carrier 100 to hold the material strip or product more stably.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A carrier configured for holding a plurality of units of a product connected to each other and carried on a material strip during horizontal conveying of the material strip in a straight line from an entry point to an exit point, the carrier comprising:
    a first holding member positioned on the upper or lower side of one or more units of the product on the material strip during the horizontal conveying of the material strip and extending along a conveying direction of the material strip,
    wherein a first contact surface is formed on the side of the first holding member facing the product, the first contact surface is configured to contact one or more units of the product during the horizontal conveying of the material strip to limit an up and down bouncing movement of the product.

2. The carrier according to claim 1, wherein a second contact surface is also formed on the side of the first holding member facing the product, and the second contact surface is configured to contact the material strip during the horizontal conveying of the material strip to limit the up and down bouncing movement of the material strip.

3. The carrier according to claim 2, wherein the first contact surface and the second contact surface extend along the conveying direction of the material strip and are separated from each other.

4. The carrier according to claim 2, wherein a connecting line along the surface contour of the contact surface between any two points of the first contact surface or the second contact surface along the conveying direction of the material strip is a Bezier curve.

5. The carrier according to claim 1, wherein the product extends from the material strip in a horizontal direction perpendicular to the conveying direction of the material strip, and the first contact surface is configured to contact a free end of the product during the horizontal conveying of the material strip.

6. The carrier according to claim 2, further comprising:
    a beam member detachably provided on the side of the first holding member facing the product, and the first contact surface and/or the second contact surface are at least part of the surface of the beam member facing the product or the material strip.

7. The carrier according to claim 6, wherein the side of the first holding member facing the product is provided with a slot, and the beam member is removably embedded in the slot.

8. An inspection system, comprising:
the carrier according to claim 1, wherein at least one of the first holding member and the second holding member is provided with an inspection window to allow inspection of the product on the material strip through the inspection window; and
an inspection device configured to inspect the product carried on the carrier.

9. The inspection system according to claim 8, further comprising:
at least one stabilizer, each of which is arranged at upstream or downstream of the carrier along the conveying direction of the material strip, and supports the product and/or the material strip on the side opposite to the first holding member of the carrier.

10. A carrier configured for holding a plurality of units of a product connected to each other and carried on a material strip during horizontal conveying of the material strip, the carrier comprising:

a first holding member positioned on the upper or lower side of the product on the material strip during the horizontal conveying of the material strip and extending along a conveying direction of the material strip, wherein a first contact surface is formed on the side of the first holding member facing the product, the first contact surface is configured to contact the product during the horizontal conveying of the material strip to limit an up and down bouncing movement of the product; and a second holding member, which is engaged with the first holding member to form an L-shaped structure, wherein at least one of the first holding member and the second holding member is provided with an inspection window to allow inspection of the product on the material strip through the inspection window.

\* \* \* \* \*